Patented Dec. 26, 1933

1,940,899

UNITED STATES PATENT OFFICE 1,940,899

METHOD OF PREPARING HORTICULTURAL DUST

Amos E. Badertscher, Baltimore, Md., assignor to McCormick & Company, Inc., Baltimore, Md., a corporation of Maryland No Drawing. Application January 21, 1932
Serial No. 587,964

2 Claims. (Cl. 167—24)

This invention relates to a horticultural dust for application to plants in a dry form for the destruction of insects such as Mexican bean beetle, sow bug, thrips, leaf hoppers, mushroom pests, etc., and consists of a method for its preparation.

The horticultural dust in accordance with this invention comprises essentially a non-alkaline, inert material, in powdered form and desirably having an absorptive capacity, and the active principle of pyrethrum, or such in admixture with rotonone.

The non-alkaline inert material may be of any desired type, as for example, a siliceous earth, talc, bentonite, etc.

The active principle of pyrethrum may be obtained in any usual manner as by extraction from pyrethrum flowers, with an organic solvent. Rotonone may be obtained by extraction of a certain fish-poison plant, Deguelia (Derris elliptica) and from the roots of certain species of South American Lonchocarpus, such as, cube, haiari and timbo, with acetone or carbontetrachloride.

In the preparation of the horticultural dust in accordance with this invention the non-alkaline inert material in finely divided form, for example, talc, will be sprayed with a solution of the active principle of pyrethrum, or such together with rotonone, in a volatile solvent, as a light petroleum distillate. During the spraying the inert material will be agitated and maintained at a temperature at which the solvent used will volatilize readily. As a result of the evaporation of the solvent, the sprayed inert material will be coated and impregnated with the active principle of pyrethrum, or such together with rotonone and may be used by dusting over plants to be treated. If desired, the coated, impregnated, inert material may be mixed with ground Derris root or ground Cubé root.

As illustrative, for example, the horticultural dust in accordance with this invention may comprise 80-95% inert material and 5-20% pyrethrum, or pyrenthrum and rotonone, and the coated, impregnated, inert material may, if desired, be admixed with ground Derris root or ground Cubé root in the proportion of 60 parts inert material to 40 parts of ground Derris or Cubé root, or a mixture thereof.

As illustrative of the preparation of a horticultural dust in accordance with this invention, for example, 95 pounds of talc may be sprayed with 5 pounds of a solution containing 2 grams of pyrethrins, the active principles of pyrethrum, in 100 cc. of petroleum spirits, carbontetrachloride, or similar solvents; the talc being agitated during the spraying and heated to a temperature of 80° C. at which the solvent will readily volatilize, leaving the talc coated and impregnated with the active principles of pyrethrum.

It will be understood that in carrying out the method embodying this invention the purpose of the solvent is merely to carry the pyrethrum or rotonone in a dispersed state so that the inert material may be impregnated and/or coated therewith. Hence, any solvent which may be removed as by evaporation after application to the inert material may be used.

What I claim and desire to protect by Letters Patent is:

1. The method of producing a horticultural dust which includes spraying a non-alkaline inert material in finely divided form with the active principle of pyrethrum in solution in a volatile solvent while agitating the inert material and maintaining it at a temperature at which the solvent will evaporate.

2. The method of producing a horticultural dust which includes spraying talc with the active principle of pyrethrum in solution in a volatile solvent while agitating the inert material and maintaining it at a temperature at which the solvent will evaporate.

AMOS E. BADERTSCHER.